United States Patent [19]
Basile

[11] 3,917,771
[45] Nov. 4, 1975

[54] SEALANT FILLER FOR SMALL VOLUMES CONTAINING AN ACRYLIC LATEX, SAND, BENTONITE, PORTLAND CEMENT AND A POLYHYDRIC ALCOHOL

[76] Inventor: Mario J. Basile, 8512 Fifth Ave., Brooklyn, N.Y. 11209

[22] Filed: Jan. 9, 1974

[21] Appl. No.: 431,842

[52] U.S. Cl. ............... 264/35; 106/111; 260/29.6 R; 260/29.6 S; 260/42.13; 260/33.4 PQ; 264/36
[51] Int. Cl.² ........................................... E04B 1/16
[58] Field of Search ........ 260/29.6 S, 29.6 R, 42.13, 260/33.4 PQ; 106/111; 264/35, 36

[56] References Cited
UNITED STATES PATENTS

| | | | |
|---|---|---|---|
| 2,580,230 | 12/1951 | Kunze et al. | 260/29.6 |
| 2,884,396 | 4/1959 | Allegretti | 260/29.6 |
| 3,196,122 | 7/1955 | Evans | 260/29.6 |
| 3,256,223 | 6/1966 | Heijmer | 260/29.6 |
| 3,493,529 | 2/1970 | Krottinger et al. | 260/29.6 |
| 3,522,068 | 7/1970 | Bastian et al. | 260/29.6 |
| 3,547,853 | 12/1970 | Kalandiak | 260/29.6 |
| 3,706,696 | 12/1972 | Bernett et al. | 260/29.6 |

*Primary Examiner*—Eugene C. Rzucidlo
*Attorney, Agent, or Firm*—Howard C. Miskin

[57] ABSTRACT

A two package sealant filler includes as a first paste component a dispersion of sand in a water based acrylic latex and as a second highly viscous component, a dispersion of bentonite and Portland cement in glycerine. In use, the first component and a minor amount of the second component are intimately admixed and applied to the work area where it cures throughout into an integral elastomeric mass having the appearance of concrete.

5 Claims, No Drawings

SEALANT FILLER FOR SMALL VOLUMES CONTAINING AN ACRYLIC LATEX, SAND, BENTONITE, PORTLAND CEMENT AND A POLYHYDRIC ALCOHOL

The present invention relates generally to improvements in compositions and methods for filling and sealing openings and it relates more particularly to an improved composition and method for producing a firm removable resilient filler sealant in an opening or recess, the filler sealant being self-curing and having the appearance of concrete.

It is a common practice to repair cracks, holes and other openings in walls and other structures formed of concrete, mortar or other materials by filling the opening with a filler or sealant such as caulking, spackling and the like which is initially in a fluid or plastic state and hardens, in situ, particularly when exposed to air. However, the compositions heretofore employed and the methods practiced in their application possess numerous drawbacks and disadvantages. The compositions are generally difficult and inconvenient to apply, particularly in patching deep openings, which require numerous successive applications of the filler composition separated by long awaiting intervals, the finished patch is rigid and highly subject to cracking and crazing, is difficult to remove and the compositions are of little versatility and adaptability and the patches are often of unattractive appearance, and otherwise leave much to be desired.

It is accordingly a principal object of the present invention to provide an improved composition and method for repairing cracks, holes and other small openings and recesses in exterior and interior surfaces.

Another object of the present invention is to provide an improved composition and method for sealing and filling openings in structures formed of concrete, mortar and the like.

Still another object of the present invention is to provide an improved composition and method and for filling and sealing openings requiring only a single application even in filling openings of great depths and resulting in an elastomeric patch which is firmly bonded to the adjacent faces but may be, under preselected conditions, easily removed and which is highly resistant to cracking, crazing, deterioration and adverse ambient conditions or stresses.

A further object of the present invention is to provide an improved composition and method of the above nature characterized by their ease of application, low cost, great versatility and adaptability and a strong and superior end product.

It has been found that a highly superior flexible seal and filling may be achieved in an opening by the use of a two package or component composition, one component being an aqueous latex of a synthetic organic polymeric, advantageously elastomeric resin and the other component being a mixture of Portland cement and bentonite. Advantageously the first compound is of a paste-like consistency and is formed of a water based acrylic latex or caulking having sand admixed therewith. The second component is likewise advantageously of paste-like consistency and includes, in addition to the Portland cement and bentonite, a polyhydric alcohol, preferably glycerine. The two components are separately packaged in airtight condition and have a very long shelf life.

In employing the improved composition according to the present invention, the required amount of the first component is intimately admixed with a minor amount of the second component and although the curing and hardening of the admixture is immediately initiated, it remains quite flexible and becomes thick and very pasty. It is believed that this initial reaction is consequent to the great capacity of the bentonite in the second component to thicken the latex and thereby produce a mass having less coherence and greater adhesiveness and having the property of being more readily curable or vulcanizable.

The admixture in the above state is applied to the opening to fill it to its full depth and by reason of its exposure to air a skin hardening reaction of the latex composition promptly occurs at the exposed surfaces. The mass hardening is promoted by the reaction of air with the polymeric resin latex, the thickening of the latex by the bentonite and the combining and reaction of the Portland cement in the second component with the water in the second component as well as with the sand therein. The thickening and hardening process continues until a firm but flexible mass is formed which has the appearance of concrete or mortar. Within 24 to 48 hours the hardening of the applied admixture of the patch, layer or plug is substantially completed to a firm but flexible condition, although some further hardening may occur. When a small hole is filled, the hardened filler forms a plug. The applied composition does not crack, craze, stain or bleed during its application, curing and thereafter.

In accordance with a preferred embodiment of the present invention, the first components contain between 1 and 3 parts by volume of a water based acrylic latex to sand, with the latex containing about 14% water and about 86% non-volatile solids, that is about 0.14 to 0.42 parts water and 0.86 to 2.58 parts acrylic resin in a latex state, (identify solids composition), for example, 3 parts of the acrylic latex and 1 to 3 parts by volume of sand, for example 1 part, the sand and latex being uniformly mixed. The second component includes 1 to 5 parts by volume of bentonite, for example, 1 part bentonite and 1 to 5 parts by volume of Portland cement, for example, 2 parts, the bentonite and Portland cement being suspended in a polyhydric alcohol such as glycerine, glycol, polyglycols, for example, glycerine to a paste or thick liquid.

The two components are separately packaged in an airtight condition and the filler mass is produced by intimately admixing the desired amount of the first component with a minor amount of the second component, for example, 40 to 60 parts by volume of the first component with 1 part by volume of the second component. The mass is then applied to the opening to be filled or patched in the manner described above.

The advantages of the improved composition and method are numerous when applied to both interior and exterior surfaces. The area of application is easily cleaned with water before the curing of the mass has been effected. Easy and rapid access to the covered site is available simply by snapping out the cured filler mass, since it may be penetrated by a sharp instrument to facilitate its removal. It may be replaced because of its resiliency. The applied sealant may be painted and is compatible with oil base and latex paints and a water base or dry dye or pigment may be mixed with the uncured mass. A rapid drying of the exposed surface of the sealant mass occurs.

While there have been described preferred embodiments of the present invention, it is apparent that numerous alterations, omissions and additions may be made without departing from the spirit thereof. For example, while in the specific example given above, an acrylic latex is employed in the first component latexes of other polymer resins may be used, such as a silicone latex.

What is claimed is:

1. The method of patching a recess comprising the steps of forming a first component including 0.14 to 0.42 parts water and 0.86 to 2.58 parts acrylic resin solids as a latex and 1 to 3 parts sand and a second component including a viscous suspension of 1 to 5 parts bentonite and 1 to 5 parts Portland cement in a polyhydric alcohol selected from the group consisting of glycerine, glycol and polyglycol, admixing a major part of said first component and a minor part of said second component and applying said admixture to said recess.

2. The method of claim 1 wherein said first and second components are separately packaged in an airtight condition prior to the admixture thereof.

3. The method of claim 1 wherein said first component includes 3 parts of an acrylic latex containing about 14% water and about 86% of said acrylic resin solids and 1 part of sand.

4. The method of claim 1 wherein said second component includes about 1 part of said bentonite, about 2 parts of said Portland cement and an amount of said polyhydric alcohol to form a paste.

5. The method of claim 1 wherein said second component includes about 1 part of said bentonite, about 2 parts of said Portland cement and an amount of said polyhydric alcohol to form a thick liquid.

* * * * *